United States Patent [19]

Brooks

[11] Patent Number: 5,812,759
[45] Date of Patent: Sep. 22, 1998

[54] FAULT HANDLING WITH LOADED FUNCTIONS

[75] Inventor: Jeffery W. Brooks, Mentor-On-The-Lake, Ohio

[73] Assignee: Allen Bradley Company, Inc., Milwaukee, Wis.

[21] Appl. No.: 744,911

[22] Filed: Nov. 8, 1996

[51] Int. Cl.$^6$ .............................. G06F 11/00; G06F 11/30
[52] U.S. Cl. ................................ 395/185.1; 395/185.02; 395/704; 395/183.11; 395/183.14
[58] Field of Search ........................... 395/185.1, 183.14, 395/185.01, 185.03, 701, 702, 704, 705, 183.13, 183.12, 183.11, 708, 707, 185.02

[56] References Cited

U.S. PATENT DOCUMENTS

| 4,432,051 | 2/1984 | Bogaert et al. | 364/200 |
| 5,075,847 | 12/1991 | Fromme | 395/700 |
| 5,193,178 | 3/1993 | Chillarege et al. | 395/183.01 |
| 5,317,740 | 5/1994 | Sites | 395/700 |
| 5,426,648 | 6/1995 | Simamura | 395/700 |
| 5,432,795 | 7/1995 | Robinson | 395/183.14 |
| 5,455,949 | 10/1995 | Condor et al. | 395/700 |
| 5,555,419 | 9/1996 | Arsenault | 395/700 |
| 5,583,988 | 12/1996 | Crank et al. | 395/185.01 |
| 5,594,904 | 1/1997 | Linnermark et al. | 396/183.11 |
| 5,628,016 | 5/1997 | Kukol | 395/704 |

Primary Examiner—Joseph Palys
Attorney, Agent, or Firm—David G. Luettgen; John M. Miller; John J. Horn

[57] ABSTRACT

A method of handling a fault which occurs during execution of an executable program comprises the steps of designating a first sequence of instructions of the executable program as visible and designating a second sequence of instructions of the executable program as invisible. According to this scheme, for the first visible sequence of instructions, faults are reported in a manner which designates an instruction at which the fault occurred. For the second invisible sequence of instructions, faults are reported in a manner which designates the invisible sequence of instructions as a whole. The invention permits fault handling for instructions added by a user to be performed in the same way as fault handling for built-in functions, and is usable with compiled machines.

27 Claims, 6 Drawing Sheets

```
Enter Invisible 31  if(PD_recover_frame == 0)
    {
32      PD_recover_frame = MPRisc.FP;
33      PD_recover_ret_addr = MPRisc.Link;
34      PD_recover_stack = MPRisc.SP;
35      PD_fault_addr = 0;
    }
36  else
    {
37      Pointer = allocate(two words from the stack);
38      Pointer->address = MPRisc.Link;
39      Pointer->next = PD_fault_addr;
40      PD_fault_addr = Pointer;
    }
```

FIG. 2

```
Exit Invisible:

51    if(PD_recover_frame == MPRisc.FP)
      {
52        PD_recover_frame = 0;
53        PD_fault_addr = 0;
54        MPRisc.SP = PD_recover_stack;
      }
55    else if(PD_fault_addr)
      {
56        MPRisc.SP = PD_fault_addr + 4 bytes;
57        PD_fault_addr = PD_fault_addr->next;
      }
```

FIG. 3

Fault Reporting:

```
61   if(PD_recover_frame)
     {
62       recover_address = PD_recover_ret_addr;
63       if(PD_fault_addr)
         {
64           fault_address = PD_fault_addr->address;
65       }
         else
         {
66           fault_address = PD_recover_ret_addr;
         }
     }
67   else
     {
68       recover_address= MPRisc.PC - 8 bytes;
69       fault_address = MPRisc.PC - 8 bytes;
70       PD_recover_ret_addr = recover_address;
     }
```

FIG. 4

Fault Recovery:

81    MPRisc.Link = PD_recover_ret_addr;

82    if(PD_recover_frame)
      {
83        MPRisc.FP = PD_recover_frame;
84        MPRisc.SP = PD_recover_stack;
85        PD_recover_frame = 0;
86        PD_fault_addr = 0;
      }

FIG. 5

FAULT HANDLING WITH LOADED FUNCTIONS

FIELD OF THE INVENTION

This invention relates to schemes for handling faults which occur during the execution of a program in a microprocessor-based device, and more particularly relates to schemes for handling faults which occur during the execution of functions whose contents are to be kept secret, such as loaded functions.

DESCRIPTION OF RELATED ART

Programmable logic controller (PLC®) systems are widely known for controlling industrial processes. To adapt a PLC system for a given purpose, an end user programs the PLC using a basic set of instructions provided with the PLC system. The basic set of instructions forms (for example) a high level ladder logic programming language of a type which is known. Using a graphical editor, icons are combined to form rungs of a ladder (each icon representing one instruction). However, the specific contents of the icons are kept secret from the end user and the end user is not allowed to decompile or edit the instructions.

During the execution of the user's program, it can of course happen that a fault occurs. The PLC system is provided with fault handling routines which are designed to handle such faults. Specifically, the fault handling routines are typically designed to engage in both fault reporting and fault recovery.

Fault reporting requires generating a fault address. When a fault occurs during execution of a user program, it is necessary to report the location in the user program which caused the fault, so that the user may take appropriate action. The fault location must be reported with respect to the user's high level ladder logic program and not with respect to the low level executable code which implements the user program. This is because reporting the fault with respect to the low level code would not be meaningful to the user, since the user is not given access to the low level code.

Fault recovery requires generating a recover address. Generally, the user is given some control over fault handling routines inside the PLC system. Sometimes, the user will decide that certain faults are non-major and can be ignored. In the event of a non-major fault, fault recovery involves skipping the faulted user-level instruction and executing the next user-level instruction as if the faulted instruction was never encountered. The recover address is the address of the next user-level instruction at which execution is continued after the fault.

Traditionally, PLC systems have been implemented as interpreted machines. More recently, there has been a move towards implementing PLC systems as compiled machines. The move from implementing PLC systems as interpreted machines to implementing PLC systems as compiled machines has significantly complicated fault reporting and fault recovery.

Fault reporting and fault recovery are more easily accomplished when a PLC system is implemented as an interpreted machine, because two program counters are used. In an interpreted machine, the user program is interpreted during execution rather than compiled prior to execution. In other words, during execution of a user program in an interpreted machine, tokens corresponding to icons serve as place holders identifying instructions. When any particular token is encountered, reference is made to a mapping RAM which contains the address of a function that corresponds to the tokenized instruction. The microprocessor then performs the function contained at the address retrieved from the mapping RAM. This process is performed repeatedly as subsequent instructions are executed. From an architectural standpoint, there are two layers of program structure (a first memory space which contains the tokenized representation of the user program, a second memory space which contains executable code) and a mapping RAM which links the two layers.

In this scheme, two program counters are used which point to the two different layers. Thus, the first program counter points to the user-level instruction that is currently being executed, and the second program counter points to the low-level executable instruction that is being executed. Fault reporting and fault recovery are easily handled by reference to the first program counter, because the first program counter always points to the current user-level instruction.

In a compiled machine, the user code is compiled prior to execution. In other words, the user-level instructions are replaced with the executable code that is used to implement them. There are no tokens and no mapping RAM. Thus, the program structure in a compiled machine is a "flattened" structure having only one layer.

In this scheme, only one program counter is used, and this program counter points to low-level executable code and not to user-level instructions. Accordingly, fault reporting and fault recovery are more difficult than in an interpreted machine due to the lack of a program counter which points to user-level instructions.

One solution to this problem would be to annotate the compiled code with identifiers which correlate sections of the user program executable code to high level instructions in the ladder logic representation. However, it has been found that this approach alone is inadequate because it does not address the fact that the in-line replacement of user-level instructions with executable code during compilation is generally incomplete.

Specifically, in cases where the executable code for a given instruction would consume too much memory, the instruction is not incorporated into the "main thread" of the executable code which implements the user program. Instead, one copy of the executable code is stored (e.g., in flash memory) and function calls are made to the single copy as necessary from the main thread of user program executable code. (The executable code stored elsewhere is referred to as a built-in function.) For example, if a given user-level instruction takes only a few lines of executable code to implement, then the executable code is incorporated in its entirety into the main thread of user program executable code. On the other hand, if a given user-level instruction takes thirty lines of executable code to implement (for example), then it is not incorporated into the main thread of the executable code which implements the user program.

With respect to fault reporting, the fact that the replacement of user-level instructions is incomplete causes a problem as follows. When a function call is made, the microprocessor jumps to another part of memory to execute the instruction. Since the microprocessor jumps to another part of memory, the identifiers can no longer be used to correlate a faulted line of executable code with a specific user level instruction. This is especially the case where there are nested function calls, such that the current JSR return address no longer points to a section of the main thread of executable code. Note that the link between the user program and the function call is a JSR (jump-subroutine) type command and not a mapping RAM; thus, the program structure retains its "flattened" architecture.

The problem described is a general problem which is related to the manner in which the user program is compiled. However, in devising a solution to this problem, it would be highly advantageous if the devised solution addressed both built-in functions and what are known as loaded functions.

Loaded functions refer to functions which are added to the basic set of instructions by the user. In other words, the user is given the ability to create additional instructions by encapsulating sequences of the basic set of instructions. Again, the new instructions are executable-only instructions such that the user is unable to edit or decompile them. The loaded function is given an iconic representation and thus looks to the user like any other instruction. This may be done where the user has a proprietary process which it wants to protect. (Alternatively, the user could in fact be two separate entities, one of which being an intermediate entity which adds the loaded functions, such as an original equipment manufacturer that incorporates the PLC system into their product and then sells their product to the end user.) The encapsulation process allows the user to implement a proprietary process with the basic set of instructions without having to reveal the specifics of their process.

Given that the loaded functions are encapsulations of already-existing instructions, the probability that they will exceed thirty lines of executable code is extremely high. Thus, only a single copy of loaded functions is stored in RAM.

It is highly desirable for the loaded functions have the same "look and feel" as the original built-in functions. In the context of fault reporting, this means that when a fault occurs the fault handling routine should merely point to the loaded function which caused the fault. It should not point to the internal contents of the loaded function, as this would not be meaningful to the user.

BRIEF SUMMARY OF THE INVENTION

It is therefore an object of the invention to provide a fault handling scheme for loaded and/or built-in functions which is usable with a compiled machine.

It is another object of the invention to provide a fault handling scheme which makes the distinction between loaded functions and built-in functions transparent to a user of a compiled machine.

It is still another object of the invention to provide a fault handling scheme for loaded and/or built-in functions which contain call-back functions.

These objects are met in the present invention by dividing code into visible code and invisible code. Thus, a method of handling a fault which occurs during execution of an executable program comprises the steps of designating a first sequence of instructions of the executable program as visible and designating a second sequence of instructions of the executable program as invisible. According to this scheme, for the first visible sequence of instructions, faults are reported in a manner which designates an instruction at which the fault occurred. For the second invisible sequence of instructions, faults are reported in a manner which designates the invisible sequence of instructions as a whole.

More specifically, according to the present invention, a programmable logic controller is provided with a plurality of user-level instructions. First and second loaded functions are encapsulated thereby creating first and second additional user-level instructions. The first and second loaded functions are formed of first and second subsets of the plurality of user-level instructions. The first and second loaded functions are therefore not originally provided with the programmable logic controller but rather are later added by a user of the programmable logic controller.

The programmable logic controller is provided with a user program which is formed of a third subset of the plurality of the user-level instructions. The user program has a function call to the first loaded function. Notably, access to the first and second loaded functions is limited, such that information pertaining to the first and second subsets of instructions forming the first and second loaded functions is substantially unobtainable from a graphical display of the user program presented to the user.

The user program is compiled such that the replacement of at least some user-level instructions with executable code is incomplete. Thus, function calls to separately stored functions are required. The first and second loaded functions are among the user-level instructions which require function calls.

The execution of the user program includes making a function call to the first loaded function. Then, the first loaded function is entered and in response possession of a semaphore is given to the first loaded function and fault information corresponding to the first loaded function is stored. The semaphore is formed of a frame pointer which points to a frame of information which is saved when the first loaded function is called. Then, a function call is made to the second loaded function from the first loaded function. Then, the second loaded function is entered and in response it is ascertained that the semaphore is unavailable and the stored fault information is not overwritten.

If no fault occurs, then the second loaded function is exited, and in response it is ascertained that the second loaded function does not have possession of the semaphore and the semaphore is not made available. Then if still no fault occurs, the first function is exited, and in response it is ascertained that the first loaded function has possession of the semaphore and the semaphore is made available.

Finally, if a fault does occur, then the fault information is reported. For user-level instructions which are completely replaced with executable code, faults are reported in a manner which designates the user-level instruction at which the fault occurred. For both the first and second loaded functions, faults are reported in a manner which designates the first loaded function as a whole.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 2 illustrates a macro which is executed to enter an invisible section of code in accordance with the present invention;

FIG. 3 illustrates a macro which is executed to exit an invisible section of code in accordance with the present invention;

FIG. 4 illustrates a macro which is used to report a fault in accordance with the present invention;

FIG. 5 illustrates a macro which is used to recover from a fault in accordance with the present invention.

DETAILED DESCRIPTION OF THE PREFERRED EMBODIMENT

I. OVERVIEW OF VISIBLE AND INVISIBLE FUNCTIONS

Figure 1:
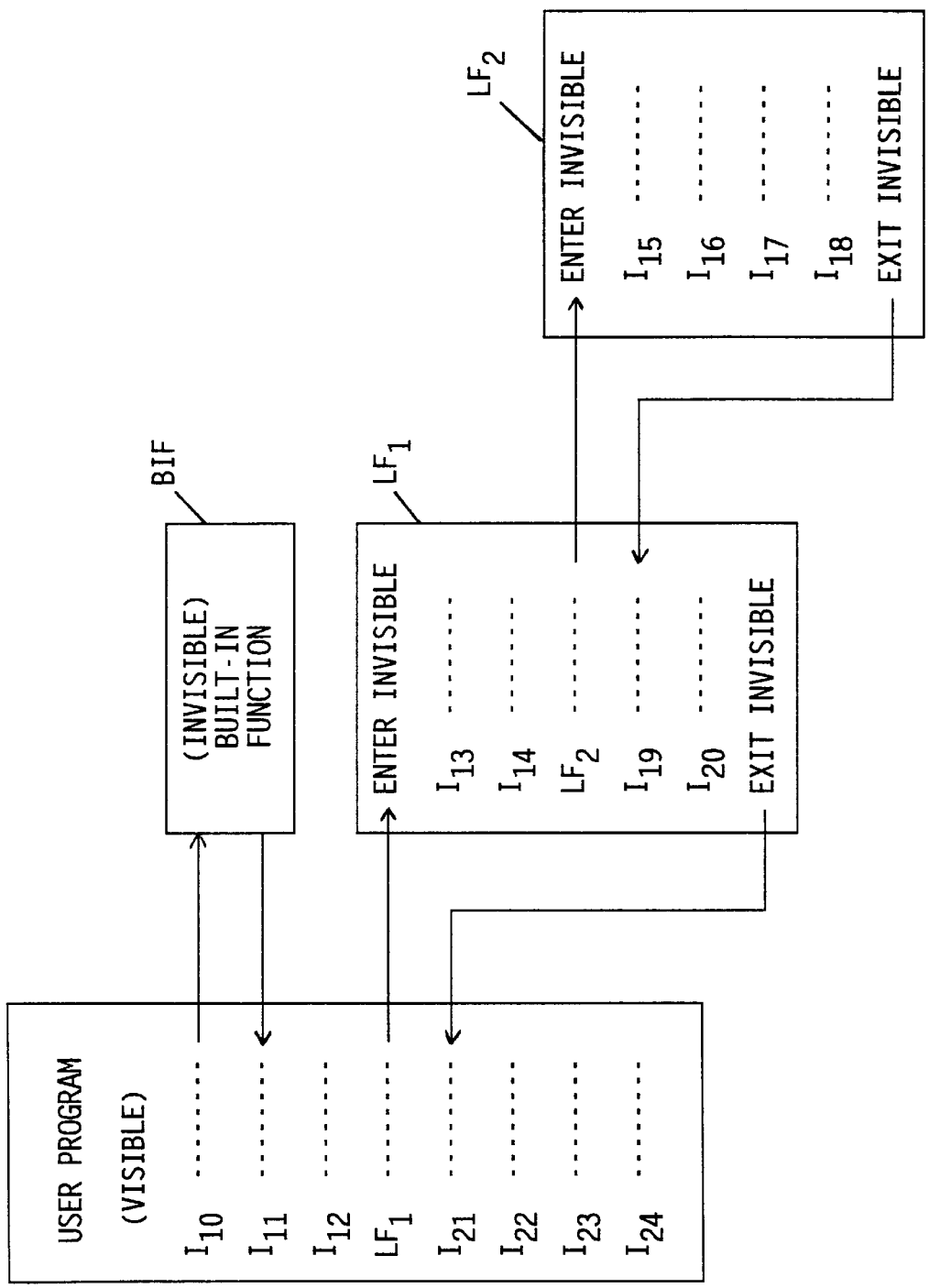
FIG. 1 illustrates a user program having nested loaded functions both of which have been designated as invisible in accordance with the present invention.

FIG. 1 illustrates an exemplary block of a user program which calls nested loaded functions in accordance with the present invention. The user program as seen by the user is set forth in the left-most column of the three columns of instructions. Thus, from the user's perspective, the user has written a program which comprises instructions $I_{10}$–$I_{12}$ and $I_{21}$–$I_{24}$ and a loaded function $LF_1$. (The fact that the loaded function $LF_1$ is a loaded function rather than a function originally provided with the PLC system is imperceptible to the user.)

When the user program is compiled, the executable code for instructions $I_{11}$–$I_{12}$ and $I_{21}$–$I_{24}$ is incorporated in-line, and constitutes the "main thread" of user code (together with the executable code needed to implement the function calls for $I_{10}$ and $LF_1$). The instruction $I_{10}$ is too large to incorporate in-line, thus, a function call is made to a built-in function BIF as illustrated. There is only one copy of the built-in function BIF stored in memory (although there are likely to be other built-in functions which are also stored separately). Thus, whenever the instruction $I_{10}$ is executed, a function call is always made to the single copy of the built-in function BIF, which is stored in a separate memory space than the main thread of user code.

Similarly, the loaded function $LF_1$ is also not incorporated in-line, and a function call is made to the instructions $I_{13}$–$I_{14}$ and $I_{19}$–$I_{20}$ and the loaded function $LF_2$, which together implement the loaded function $LF_1$. The loaded functions $LF_1$ and $LF_2$ are nested since the loaded function $LF_1$ calls the loaded function $LF_2$. The loaded function $LF_2$ is formed of instructions $I_{15}$–$I_{18}$ and, like the loaded function $LF_1$, is not incorporated in-line.

Finally, Enter Invisible and Exit Invisible macros are disposed at the beginning and end, respectively, of both of the loaded functions $LF_1$ and $LF_2$. This is the preferred way of designating the loaded functions $LF_1$ and $LF_2$ as invisible, however, other methods could be used. The remaining instructions $I_{10}$–$I_{12}$ and $I_{21}$–$I_{24}$ are designated as visible by default because they have not been designated as invisible. (Note that these macros are also inserted at the beginning and end of the built-in function BIF which implements the instruction $I_{10}$, although they are not specifically illustrated.) The Enter Invisible and Exit Invisible macros are inserted into the loaded functions as a part of the encapsulation process, and are used to implement the invisibility scheme as detailed below.

When a fault occurs, it is always reported with respect to visible code. Thus, for example, if a fault occurs at the instruction $I_{11}$, it is reported as having occurred at the instruction $I_{11}$. On the other hand, for example, if the fault occurs at the instruction $I_{14}$ or the instruction $I_{17}$, it is reported as having occurred at the loaded function $LF_1$ (which appears to the user as an ordinary instruction).

With respect to fault recovery, the execution of the user's program always continues at the next visible user instruction (i.e., assuming that such continued execution is desired). Thus, if a fault occurs at the instruction $I_{11}$, execution continues at the instruction $I_{12}$. If a fault occurs at the loaded function $LF_1$ (regardless of which instruction within the loaded function $LF_1$ caused the fault), execution continues at the instruction $I_{21}$.

II. THE ENTER INVISIBLE AND EXIT INVISIBLE MACROS

In order to implement these features, a semaphore scheme is employed in conjunction with the Enter Invisible and Exit Invisible macros. By way of overview, the semaphore is used to signal whether the microprocessor is currently inside an invisible function, and to give loaded functions the ability to save their fault information if they have possession of the semaphore. Thus, when the microprocessor enters the loaded function $LF_1$, the loaded function $LF_1$ ascertains the availability of the semaphore, takes possession of the semaphore and stores its own fault information. When the microprocessor enters the loaded function $LF_2$, the loaded function $LF_2$ is unable to overwrite the information saved by the loaded function $LF_1$ since the loaded function $LF_1$ has possession of the semaphore. Thus, if a fault occurs, the fault is reported with respect to the loaded function $LF_1$ and not with respect to the loaded function $LF_2$.

Note that, although the Enter Invisible and Exit Invisible macros are discussed with respect to loaded functions, their organization and operation is the same for built-in functions. The present invention may be applied to built-in functions in the same manner discussed herein for loaded functions.

A. ENTER INVISIBLE MACRO

The Enter Invisible and Exit Invisible macros are illustrated in greater detail FIGS. 2 and 3, respectively, which are discussed with reference to the exemplary user program illustrated in FIG. 1. (Note that the reference numerals used to designate specific lines of code have been illustrated as line numbers for the code. Ordinarily, though depending on the source code, such line numbers would not be present.)

The Enter Invisible macro is first encountered immediately after instructions $I_{10}$–$I_{12}$ are executed. Thus, when entering the loaded function $LF_1$, the semaphore is available since instructions $I_{10}$–$I_{12}$ are visible code.

The purpose of line 31 is to ascertain whether the semaphore is available. The semaphore is implemented using the PDrecoverframe variable. If PDrecoverframe=0 the semaphore is available, and if PDrecoverframe≠ the semaphore is not available. (Herein, the "PD" prefix refers to parameters which are defined in the program descriptor. As is known, a program descriptor is a data structure which is attached to the top of a program and which contains information about the program.) In this case, since the semaphore is available, PDrecoverframe=0 at line 31 and lines 32–35 are executed rather than lines 37–40.

The purpose of line 32 is to grant possession of the semaphore to the loaded function which caused execution to go invisible, in this case the loaded function $LF_1$. It is necessary that the semaphore be able to uniquely identify a given function (since if two functions are identified by the same number, it will be impossible to determine which has possession of the semaphore). Further, it is necessary that the semaphore be able to uniquely identify different invocations of a same function. In other words, it is possible that a function which has possession of the semaphore could subsequently be called in nested fashion. In order for proper operation in this situation, the different invocations must be treated like invocations of different functions, and only one invocation can be given possession of the semaphore. Thus, it is necessary to be able to distinguish different invocations of a same function.

The microprocessor frame pointer MPRisc.FP can be used to uniquely identify different functions, and different invocations of a same function, in the manner just described. The frame pointer points to a beginning of a block of data which is uniquely saved every time a function is called. When a function is called, various information is typically stored (e.g., a copy of the status register, a copy of the old frame pointer, and a copy of the return address). This information is known as a stack frame, because it is stored on a stack and because it is a frame of information that pertains to the particular function call. Since a new stack frame is created for each invocation of a function (even the same function), the frame pointer uniquely identifies both (1) invocations of different functions and (2) different invocations of a same function, as required.

Thus, in line 32, the loaded function $LF_1$ takes possession of the semaphore by setting PDrecoverframe=MPRisc.FP. Simultaneously, this same operation serves the additional purpose of storing the frame pointer in the event that the frame pointer needs to be recovered after a fault, as discussed below.

The purpose of lines 33–34 is to store parameters in the event that fault recovery is necessary. In line 33, PDrecoverretaddr is set equal to the microprocessor link register MPRisc.Link. The link register is used when function calls are made to provide a return address so that the microprocessor knows where to return when execution of the function is complete. (In a RISC microprocessor, a register is used rather than a stack. Note that although in the current embodiment a RISC microprocessor is employed, other types of microprocessors could also be used.) During fault recovery (discussed below), the microprocessor recovers by going to the address stored in PDrecoverretaddr. Thus, since PDrecoverretaddr is set equal to the link register, the microprocessor returns to the return address stored in the link register, which contains the instruction following the function call to invisible code.

In line 34, PDrecoverstack is set equal to the microprocessor stack pointer. PDrecoverstack is used to hold the contents of the stack pointer when execution became invisible. If execution is prematurely terminated (i.e., if a major fault occurs), the stack pointer will be restored to this value.

The purpose of line 35 is to establish the non-existence of nesting. A non-zero value for PDfaultaddr indicates nesting of invisible functions. Since the loaded function $LF_1$ is the first invisible function entered, there is no nesting (yet) and PDfaultaddr is set equal to zero.

Once execution of the Enter Invisible macro is complete, the instructions $I_{13}$–$I_{14}$ are executed, and another Enter Invisible macro is encountered. Line 31 is again encountered, wherein it is ascertained that the semaphore is not available, and as a result lines 32–35 are skipped and lines 37–40 are executed instead.

The purpose of lines 37–40 is to create a linked list of fault addresses. In line 37, two words are allocated from the stack thereby creating a two word memory structure. The Pointer variable points to the first address of the two word memory structure. In line 38, the first word (address) of the memory structure is loaded with the link register (which points to the return address used to return to the previous function). In line 39, the second word (next) is loaded with PDfault addr (which points to the address of the previous memory structure). In line 40, PDfaultaddr is set equal to Pointer (the address of the current structure) so that, if another function is called, PDfaultaddr points to the address of the current memory structure.

The linked list provides a way of tracing back the sequence of called functions to the main thread of the user program. An example of a linked list of addresses which might be set up by lines 37–40 is illustrated by the table below. (To give a more complete example, the table below lists additional loaded functions $LF_3$–$LF_5$ which are not illustrated in the example of FIG. 1. The table assumes that the loaded functions $LF_1$–$LF_5$ are entered sequentially before any of the remaining functions are exited.)

| Memory Location | First Word (Address: 4 bytes) | Second Word (Next: 4 bytes) |
|---|---|---|
| #4: Allocated when entering $LF_5$ | Stores return address for returning to $LF_4$ | Points to the first word of Memory Location #3 |
| #3: Allocated when entering $LF_4$ | Stores return address for returning to $LF_3$ | Points to the first word of Memory Location #2 |
| #2: Allocated when entering $LF_3$ | Stores return address for returning to $LF_2$ | Points to the first word of Memory Location #1 |
| #1: Allocated when entering $LF_2$ | Stores return address for returning to $LF_1$ | Does not point to anything |

In the above example, it can be seen that new entries are inserted at the top of the list, and that each entry consumes 8 bytes. Note also that no memory structure is allocated when entering $LF_1$, since PDrecoverretaddr already stores the link register value which provides the return address back to the main thread of user code.

B. EXIT INVISIBLE MACRO

After the second Enter Invisible macro is executed, instructions $I_{15}$–$I_{18}$ which form the loaded function $LF_2$ are executed. Then, the first exit invisible function is encountered, as illustrated in greater detail in FIG. 3.

The purpose of line 51 is to ascertain whether the loaded function under consideration (in this case, the loaded function $LF_2$) has possession of the semaphore. As mentioned above, PDrecoverframe is used to implement the semaphore and the microprocessor frame pointer MPRisc.FP uniquely identifies each different function and each different call to a same function. Thus, it is ascertained whether PDrecoverframe=MPRisc.FP in line 51. If the loaded function $LF_2$ has possession of the semaphore, then instructions $I_{52}$–$I_{54}$ are executed, otherwise instructions $I_{56}$–$I_{57}$ are executed. In this case, the loaded function $LF_2$ does not have possession of the semaphore (the "if" condition is false), and lines $I_{56}$–$I_{57}$ are executed.

The purpose of lines 56–57 is to eliminate the top entry in the linked list (see the table above) and to re-point PDfaultaddr to the next lower location in the table. Thus, in line 56, the microprocessor stack pointer MPRisc.SP is set equal to PDfaultaddr+4. As will be recalled, PDfaultaddr points to the location of the first word of the two word memory structure for the loaded function $LF_2$ (see line 40). Thus, when the stack pointer is set equal to PDfaultaddr+4, it points to the second word of the two word memory structure for the loaded function $LF_2$. In line 57, PDfaultaddr is set equal to the value stored at the second word (next) of the memory structure. In this case, the result is somewhat trivial because nothing is stored at the second word.

However, a more complete understanding can be gained by temporarily assuming that five loaded functions are sequentially called and the Enter Invisible macro creates the linked list as illustrated in the table. After entering (but before exiting) the loaded function $LF_5$, PDfaultaddr points to the memory location allocated when the loaded function $LF_5$ was entered. When the loaded function $LF_5$ is exited (i.e., when the Exit Invisible macro is executed) PDfault addr is modified so that it points to the memory location allocated when the loaded function $LF_4$ was entered. Then, when the loaded function $LF_4$ is exited, PDfaultaddr is modified so that it points to the memory location allocated when the loaded function $LF_3$ was entered. This occurs repeatedly until all items on the linked list are eliminated when the loaded function $LF_2$ is exited.

Referring again to the example of FIG. 1, after exiting the loaded function $LF_2$ the instructions $I_{19}$–$I_{20}$ are executed. Then, the second Exit Invisible is encountered for exiting the loaded function $LF_1$. In this case, PDrecoverframe=MPRisc.FP at line 51 (since the loaded function $LF_1$ has possession of the semaphore) and lines 52–54 are executed.

The purpose of lines 52–54 is to restore the microprocessor stack pointer and other parameters to their original values before invisibility was entered. Thus, in line 52 PDrecoverframe is set equal to zero (thus, the loaded function $LF_1$ releases possession of the semaphore). (It will be noted that, by way of the combination of lines 51–52, only the loaded function that has possession of the semaphore is able to release possession and make the semaphore available, as should be the case.)

In line 53, PDfaultaddr is set equal to zero. As will be recalled, PDfaultaddr points to the linked list. Thus, this is the final step in eliminating the linked list created by lines 37–40 of the Enter Invisible macro.

In line 54, MPRisc.SP is set equal to PDrecoverstack. As will be recalled, the opposite equality was set in line 34 of the Enter Invisible macro when the loaded function $LF_1$ was entered (i.e., PDrecoverstack was set equal to MPRisc.SP). Thus, line 54 restores the microprocessor stack pointer to its original value.

After the loaded function $LF_1$ is exited, the instructions $I_{21}$–$I_{24}$ are executed and the execution of the exemplary block of code illustrated in FIG. 1 is complete.

III. FAULT REPORTING AND FAULT RECOVERY

It could instead be the case that a fault occurs while executing one of the instructions in the exemplary block of code. FIG. 4 illustrates a sequence of instructions which is used to report a fault address and generate a recover address in accordance with the present invention. FIG. 5 illustrates a sequence of instructions which is used to generate a recover address for automatic fault recovery (i.e., assuming such recovery is desired).

It should be noted that the fault address and the recover address which are generated by FIG. 4 point back to the main thread of executable user code. Once these addresses are generated, conventional fault reporting firmware is used to convert these addresses into information that is usable by the user. This is done by way of identifiers which annotate the executable user code and which relate the executable code to the user level instructions, as previously discussed. Such fault reporting firmware is within the skill of a person of ordinary skill in the art given the discussion herein.

A fault could occur in essentially one of three places: in visible code, inside the loaded function $LF_1$ but not inside the loaded function $LF_2$, and inside both the loaded functions $LF_1$ and $LF_2$. With reference to FIGS. 4 and 5, these three possibilities are handled in order.

A. FAULT REPORTING AND RECOVERY FOR VISIBLE FUNCTIONS

First, assume that the fault occurs in visible code, for example at the instruction $I_{11}$. The purpose of line 61 is to ascertain whether the microprocessor is executing visible or invisible code. In this case, since the instruction $I_{11}$ is visible code, PDrecoverframe=0 in line 61 and lines 68–70 are executed whereas lines 62–66 are skipped.

The purpose of lines 68–69 is to point the local variables used for fault handling (recoveraddress and faultaddress) at the faulted instruction. At lines 68 and 69, recoveraddress and faultaddress respectively, are set equal to the microprocessor program counter MPRisc.PC less eight bytes (two words). The fault address tells the user where the fault occurred, and the recover address is used by the microprocessor if execution is to resume after the fault.

Note that the microprocessor used in the exemplary embodiment pre-fetches two instructions. Thus, the program counter is two words ahead of the executed instruction. Accordingly, in order to report the fault, two words (8 bytes) must be subtracted from the program counter in order for the program counter to point at the faulted instruction.

The purpose of line 70 is to give PDrecoverretaddr a meaningful fault recovery address in the event that fault recovery is desired. At line 70, PDrecoverretaddr is set equal to recoveraddress. Note that since instruction $I_{11}$ is visible code, line 33 of the Enter Invisible macro (which sets PDrecoverretaddr=MPRisc.Link) has not been executed, thereby making line 70 necessary. PDrecoverretaddr must have a meaningful value in order for proper fault recovery as set forth in line 81 of FIG. 5.

With reference to FIG. 5, the purpose of line 81 is to provide the microprocessor with a recover address. Thus, the microprocessor link register MPRisc.Link is set equal to PDrecoverretaddr in line 81. Accordingly, execution continues at the address provided by PDrecoverretaddr. If execution is visible, the address points to the next executable instruction following the instruction the instruction that caused the fault, otherwise the address points to the instruction following the invocation of invisible code, as discussed above.

The purpose of line 82 is to ascertain whether the fault occurred during the execution of visible code or invisible code. Thus, at line 82, it is ascertained that PDrecoverframe=0 (i.e., that the "if" condition is false) since the semaphore is available. Accordingly, lines 83–86 are skipped.

B. FAULT REPORTING AND RECOVERY FOR UNNESTED INVISIBLE FUNCTIONS

Second, assume the fault occurs at instruction $I_{13}$ (i.e., inside the loaded function $LF_1$ but not inside the loaded function $LF_2$). Referring again to FIG. 4, since instruction $I_{13}$ is invisible code, PDrecoverframe≠0 at line 61, and lines 62–66 are executed whereas lines 67–70 are skipped.

The purpose of line 62 is to set the recoveraddress variable (which is the address at which the user is told to continue execution) equal to PDrecoverretaddr (which is the address at which the microprocessor would continue execution on its own if instructed to do so automatically).

The purpose of line 63 is to ascertain whether the microprocessor is executing nested invisible code. Since the instruction $I_{13}$ is not inside a nested loaded function, PD faultaddr=0 at line 63, causing line 64 to be skipped and line 66 to be executed.

The purpose of line 66 is to give faultaddress a value which points back to the main thread of user code. Since the microprocessor is not executing nested invisible code, the address at which the fault is reported is the same as the address at which execution continues. (Note that, strictly speaking, execution is first returned to the faulted user-level instruction so that stack clean-up operations may be performed before continuing to the next user level instruction.) Since PDrecoverretaddr was set equal to the microprocessor link register in line 33, the fault address is the return address for the function $LF_1$, which points back to the main thread of the user program. Thus, faultaddress is set equal to PD recoverretaddr.

With reference to FIG. 5, again MPRisc.Link is set equal to PDrecoverretaddr at line 81 and the availability of the semaphore is checked in line 82, as discussed above. In this case the semaphore is not available since the instruction $I_{13}$ is invisible code. Thus, lines 83–86 are executed.

The purpose of lines 83–86 is to restore various parameters to the value they had before invisibility was entered. Thus, at line 83, the microprocessor frame pointer MPRisc.FP is set equal to PDrecoverframe and at line 84 the microprocessor stack pointer MPRisc.SP is set equal to PD recoverstack. It will be noticed by a comparison of lines 83 and 84 with lines 32 and 34 that PDrecoverframe and PD recoverstack essentially serve to temporarily store the frame pointer and the stack pointer while operation is invisible.

At line 85, PDrecoverframe (which indicates invisibility) is set equal to zero, and at line 86 PDfaultaddr (which indicates nested invisibility) is set equal to zero. These values are reset to zero since recovery involves returning to visible operation.

C. FAULT REPORTING AND RECOVERY FOR NESTED INVISIBLE FUNCTIONS

Third, assume the fault occurs at the instruction $I_{16}$ (i.e., inside both loaded functions $LF_1$ and $LF_2$). In this case, both PDrecoverframe and PDfaultaddr are non-zero at lines 61 and 63, thereby indicating nested invisibility. Thus, only lines 62 and 64 are executed. Line 62 is discussed above in conjunction with fault handling for unnested invisible functions.

The purpose of line 64 is to give faultaddress the value of the first word (address) of the current two word memory structure of the linked list. As noted above, in the preferred embodiment, execution of the user's program always continues at the next visible instruction during fault recovery. However, as an alternative embodiment, execution could be made to continue inside invisible code. For example, if a fault occurs inside the loaded function $LF_2$ at the instruction $I_{17}$, execution could be made to continue at the instruction $I_{19}$ rather than at the instruction $I_{21}$. To this end, giving fault address the value of the first word (address) of the current two word memory structure is useful because it allows the return address for returning to the function $LF_1$ to be determined by examining faultaddress.

In this case, the faultaddress is taken from the most recent entry in the linked list of addresses. In other words, fault address is loaded with the first (address) word of the two word memory structure which was allocated when the loaded function $LF_2$ was entered.

With reference to FIG. 5, it should be noted that the execution of lines 81–86 is not affected by whether invisible operation is nested as opposed to unnested. Accordingly, fault recovery is the same for the instruction $I_{16}$ as it is for the instruction $I_{13,}$ and there is no need to further discuss FIG. 5.

IV. CALL BACK FUNCTIONS

Figure 6:
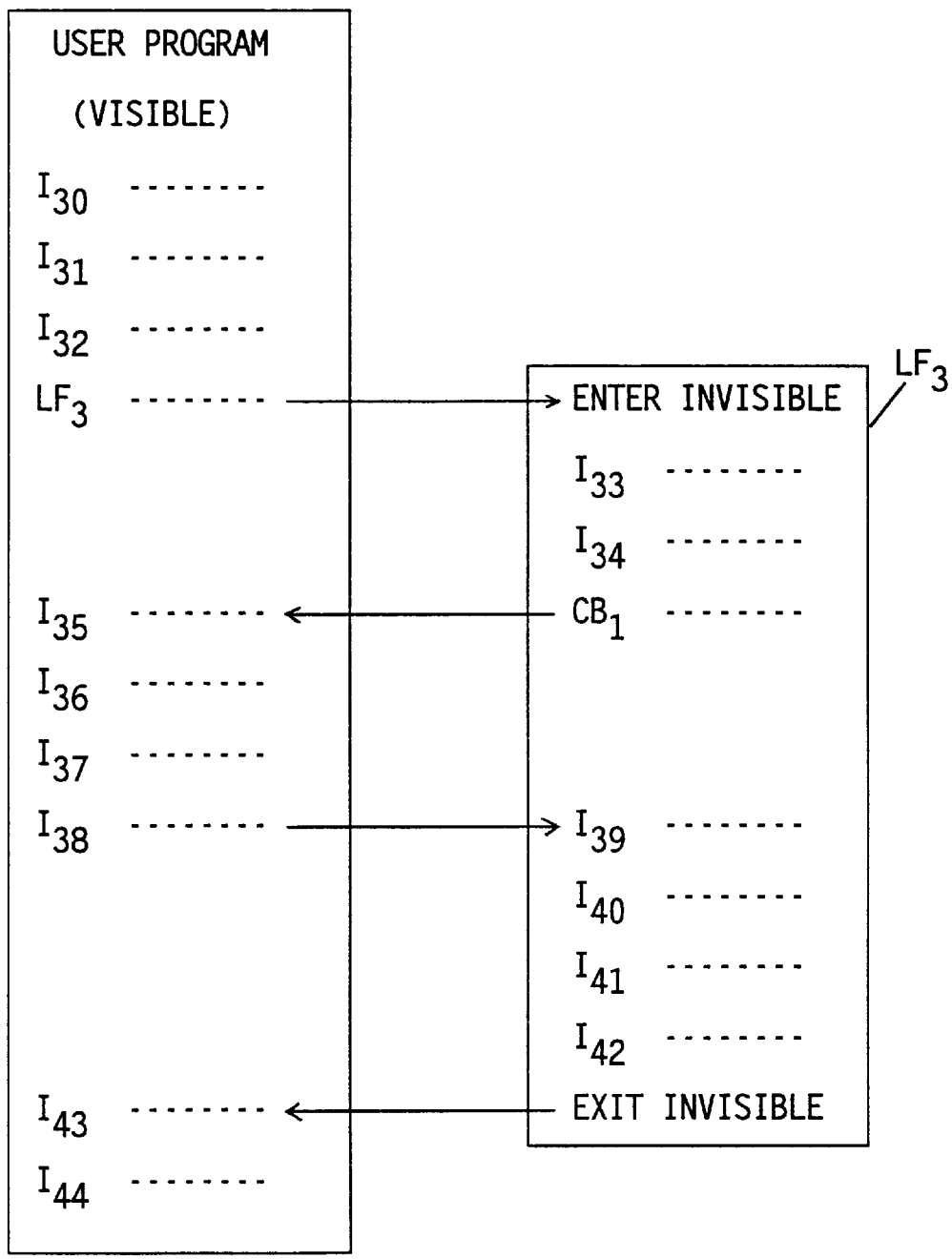
FIG. 6 illustrates a user program having a loaded function which calls visible user code in accordance with the present invention.

FIG. 6 illustrates a user program having a loaded function which needs to call visible code. The situation can arise as follows. For example, suppose the PLC system is purchased by an original equipment manufacturer who has a proprietary process and thus who takes advantage of the ability to add loaded functions. In their loaded function, it is necessary to issue commands to a conveyor system, although the particular conveyor system used is unimportant to their proprietary process. By way of the call back function scheme as discussed herein, the OEM is thus given the ability to write their encapsulated function, but allow the end user to fill in the specifics as pertains to the conveyor system.

As illustrated in FIG. 6, a user program comprises instructions $I_{30}$–$I_{32}$ and $I_{43}$–$I_{44}$. Further, the user program calls a loaded function $LF_3$ (provided by the OEM) which comprises instructions $I_{33}$–$I_{34}$ and $I_{39}$–$I_{42}$. Further, the loaded function uses a call back function $CB_1$, which makes a function call to instructions $I_{35}$–$I_{38}$ which are visible in the user program and which are not encapsulated as part of the loaded function. If a fault occurs at one of the instructions $I_{35}$–$I_{38}$, it is desirable that the fault be reported with respect to the individual instruction $I_{35}$–$I_{38}$ that caused the fault, since these are instructions which the user has programmed.

The use of invisibility with call back functions can be implemented as follows. First, the microprocessor enters invisibility as previously described. When it is time to call the call back function, the information pertaining to invisibility is saved on the stack (in the present example, this would include Pdrecoverframe, Pdrecoverstack, Pdrecoverretaddr, and PDfaultaddr). Then, these parameters are cleared so that operation appears to be visible and the instructions $I_{35}$–$I_{38}$ are executed. Then, the stored information is pulled back off the stack and the parameters in the program descriptor are restored, so that operation again appears to be invisible. Finally, the instructions $I_{39}$–$I_{42}$ are executed and an Exit Invisible is encountered in the manner previously discussed.

Many changes and modifications may be made to the present invention without departing from the spirit thereof. The scope of these and other changes will become apparent from the appended claims.

I claim:

1. A method of handling a fault which occurs during execution of an executable program formed by compiling a user program, the method comprising:

designating a first sequence of instructions of said executable program as visible;

designating a second sequence of instructions of said executable program as invisible, said second sequence of instructions implementing a plurality of user-level instructions;

wherein, for said first visible sequence of instructions, faults are reported in a manner which designates a user-level instruction at which the fault occurred;

wherein, for said second invisible sequence of instructions, faults are reported in a manner which designates said invisible sequence of instructions as a whole;

wherein said second sequence of instructions includes an outer sequence of instructions and an inner sequence of instructions, and further comprising the steps of separately designating said outer and inner sequences of instructions as invisible and giving possession of a semaphore to said outer sequence of instructions, said semaphore giving said outer sequence of instructions authority to make execution visible upon exiting said outer sequence of instructions and preventing said inner sequence of instructions from making execution visible.

2. A method according to claim 1, wherein said semaphore is formed of a frame pointer, said frame pointer pointing to a frame of information which is saved when said outer sequence of instructions is called.

3. A method of handling a fault which occurs during execution of an executable program formed by compiling a user program, the method comprising:
  designating a first sequence of instructions of said executable program as visible;
  designating a second sequence of instructions of said executable program as invisible, said second sequence of instructions implementing a plurality of user-level instructions;
  wherein, for said first visible sequence of instructions, faults are reported in a manner which designates a user-level instruction at which the fault occurred;
  wherein, for said second invisible sequence of instructions, faults are reported in a manner which designates said invisible sequence of instructions as a whole; and
  wherein said user program is compiled such that said first sequence of instructions replaces an original user-level instruction and such that a function call to said second sequence of instructions replaces a subsequently-encapsulated user-level instruction.

4. A method according to claim 3, further comprising the step of limiting access to said first and second sequences of instructions such that information pertaining to said first and second sequences of instructions is substantially unobtainable from a graphical display of said user program.

5. A method of handling a fault which occurs during execution of an executable program formed by compiling a user program, the method comprising:
  designating a first sequence of instructions of said executable program as visible;
  designating a second sequence of instructions of said executable program as invisible, said second sequence of instructions implementing a plurality of user-level instructions;
  executing a call back function during said execution of said executable program, including the steps of
    making a function call to said visible sequence of instructions from said invisible sequence of instructions, and
    saving information pertaining to the availability of a semaphore when said function call is made;
  wherein, for said first visible sequence of instructions, faults are reported in a manner which designates a user-level instruction at which the fault occurred; and
  wherein, for said second invisible sequence of instructions, faults are reported in a manner which designates said invisible sequence of instructions as a whole.

6. A method of handling a fault which occurs during execution of a user program in an industrial controller, the method comprising:

A. encapsulating an inner sequence of instructions of said program;
B. encapsulating an outer sequence of instructions of said program, said outer sequence of instructions including said inner sequence of instructions and an additional plurality of instructions;
C. compiling said program, then
D. executing said compiled program with a microprocessor of said industrial controller, said executing step including the steps of
  (1) making a function call to said outer sequence of instructions, then
  (2) entering said outer sequence of instructions, and in response to said entering step (2), giving possession of a semaphore to said outer sequence of instructions and storing fault information corresponding to said outer sequence of instructions, then
  (3) making a function call to said inner sequence of instructions, then
  (4) entering said inner sequence of instructions, and in response to said entering step (4), ascertaining that said outer sequence of instructions has possession of said semaphore and not overwriting said fault information,
  (5) reporting a fault, said step of reporting a fault including the step of reporting said fault information.

7. A method according to claim 6, wherein said semaphore gives said outer sequence of instructions exclusive authority to overwrite said fault information when said outer sequence of instructions is being exited, said authority being exclusive with respect to other encapsulated functions.

8. A method according to claim 6, wherein said semaphore is formed of a frame pointer, said frame pointer pointing to a frame of information which is saved when said function call to said outer sequence of instructions is made.

9. A method according to claim 6,
  wherein, for non-encapsulated instructions, faults are reported in a manner which designates a user-level instruction at which the fault occurred; and
  wherein, for both said inner and outer sequences of instructions, faults are reported in a manner which designates said outer sequence of instructions as a whole.

10. A method according to claim 6,
  wherein said user program is compiled such that the replacement of at least some user-level instructions with executable code is incomplete and function calls to separately stored functions are utilized,
  wherein said outer sequence of instructions forms a first user-level instruction and said inner sequence of instructions forms a second user-level instruction, and
  wherein said first and second user-level instructions are among said instructions which utilize functions calls.

11. A method according to claim 10, further comprising the step of limiting access to said first and second user-level instructions such that information pertaining to said outer and inner sequences of instructions is substantially unobtainable from a graphical display of said first and second user-level instructions presented to said user.

12. A method according to claim 6, wherein during said executing step (D), a function call is made to a non-encapsulated portion of said user program.

13. A method comprising the steps of:
A. providing an industrial controller with a plurality of user-level instructions;
B. encapsulating a loaded function and thereby creating an additional user-level instruction, said loaded function being formed of a first subset of said plurality of user-level instructions, said loaded function not being originally provided with said industrial controller but rather being later added by a user of said industrial logic controller;

C. providing said industrial controller with a user program, said user program being formed of a second subset of said plurality of said user-level instructions, said user program having a function call to said loaded function;

D. compiling said user program, said user program being compiled such that the replacement of at least some user-level instructions with executable code is incomplete and function calls to separately stored functions are utilized, and wherein said loaded function is among said user-level instructions which utilize function calls;

E. executing said user program, said executing step including the steps of
  (1) making a function call to said loaded function,
  (2) entering said loaded function, and in response to said entering step (2), giving possession of a semaphore to said loaded function and storing fault information corresponding to said loaded function, then
  (3) making a function call to a non-encapsulated portion of said user program and temporarily storing information pertaining to said entry into said loaded function, then
  (4) entering said non-encapsulated portion of said user program, then
  (5) returning to said loaded function and retrieving said information pertaining to said entry into said loaded function,
  (6) reporting a fault, said step of reporting said fault including the step of reporting said fault information,
    wherein, for said non-encapsulated portion of said user program, faults are reported in a manner which designates the user-level instruction at which said fault occurred,
    wherein, for encapsulated user-level instructions which form said loaded function, faults are reported in a manner which designates said loaded function as a whole.

14. A method according to claim 13, further comprising the step of limiting access to said loaded function such that information pertaining to said first subset of instructions forming said loaded function is substantially unobtainable from a graphical display of said user program presented to said user, said limiting step including the step of designating said loaded function as invisible.

15. A method according to claim 13, wherein said semaphore is formed of a frame pointer which points to a frame of information which is saved when said loaded function is called.

16. A method of comprising the steps of:
A. providing an industrial controller with a plurality of user-level instructions;
B. encapsulating a first loaded function and thereby creating a first additional user-level instruction, said first loaded function being formed of a first subset of said plurality of user-level instructions, said first loaded function not being originally provided with said industrial controller but rather being later added by a user of said industrial controller;
C. encapsulating a second loaded function and thereby creating a second additional user-level instruction, said second loaded function being formed of a second subset of said plurality of user-level instructions and being called by way of a function call by said first loaded function, said second loaded function not being originally provided with said industrial controller but rather being later added by a user of said industrial controller;

D. providing said industrial controller with a user program, said user program being formed of a third subset of said plurality of said user-level instructions, said user program having a function call to said first loaded function;

E. limiting access to said first and second loaded functions such that information pertaining to said first and second subsets of instructions forming said first and second loaded functions is substantially unobtainable from a graphical display of said user program presented to said user, said limiting step including the step of designating said first and second loaded functions as invisible;

F. compiling said user program, said user program being compiled such that the replacement of at least some user-level instructions with executable code is incomplete and function calls to separately stored functions are utilized, and wherein said first and second loaded functions are among said user-level instructions which utilize function calls;

G. executing said user program, said executing step including the steps of
  (1) making a function call to said first loaded function,
  (2) entering said first loaded function, and in response to said entering step (2), giving possession of a semaphore to said first loaded function and storing fault information corresponding to said first loaded function, said semaphore being formed of a frame pointer which points to a frame of information which is saved when said first loaded function is called, then
  (3) making a function call to said second loaded function from said first loaded function, then
  (4) entering said second loaded function, and in response to said entering step (4), ascertaining that said first loaded function has possession of said semaphore and not overwriting said fault information, then
  (5) if no fault occurs, then exiting said second loaded function, and in response to said exiting step (5), ascertaining that said second loaded function does not have possession of said semaphore and not making said semaphore available, then
  (6) if no fault occurs, then exiting said first loaded function, and in response to said exiting step (6), ascertaining that said first loaded function has possession of said semaphore and making said semaphore available,
  (7) and, if a fault does occur, then reporting said fault, said step of reporting said fault including the step of reporting said fault information,
    wherein, for user-level instructions which are completely replaced with executable code, faults are reported in a manner which designates the user-level instruction at which said fault occurred,
    wherein, for both said first and second loaded functions, faults are reported in a manner which designates said first loaded function as a whole.

17. A method according to claim 16, wherein during said executing step (G), a function call is made to a non-encapsulated portion of said user program.

18. A method of handling a fault which occurs during execution of an executable program formed by compiling a user program, the method comprising:

designating a first sequence of instructions of said executable program as visible, said user program being compiled such that said first sequence of instructions replaces a first user-level instruction;

designating a second sequence of instructions of said executable program as invisible, said user program being compiled such that a function call to said second sequence of instructions replaces a second user-level instruction;

wherein, for said first visible sequence of instructions, faults are reported in a manner which designates said first user-level instruction;

wherein, for said second invisible sequence of instructions, faults are reported in a manner which designates said second user-level instruction; and wherein said second user-level instruction is an encapsulated user-level instruction, said encapsulated user-level instruction being an encapsulation of a plurality of user-level instructions.

19. A method according to claim 18, wherein said second sequence of instructions includes an outer sequence of instructions and an inner sequence of instructions, and further comprising the step of separately designating said outer and inner sequences of instructions as invisible.

20. A method according to claim 18, wherein said execution of said executable program is performed by an industrial controller, wherein the method further comprises the step of encapsulating said plurality of user-level instructions so as to form said encapsulated user-level instruction, said encapsulating step being performed by a first user of said industrial controller, and wherein said user program is a program written by a second user of said industrial controller.

21. A method of handling a fault which occurs during execution of an executable program formed by compiling a user program, the method comprising:

designating a first sequence of instructions of said executable program as visible, said user program being compiled such that said first sequence of instructions replaces a first user-level instruction;

designating a second sequence of instructions of said executable program as invisible, said user program being compiled such that a function call to said second sequence of instructions replaces a second user-level instruction;

wherein, for said first visible sequence of instructions, faults are reported in a manner which designates said first user-level instruction;

wherein, for said second invisible sequence of instructions, faults are reported in a manner which designates said second user-level instruction; and wherein said second user-level instruction is implemented by a built-in function formed of said second sequence of instructions.

22. A method according to claim 21, wherein said execution of said executable program is performed by an industrial controller.

23. A method according to claim 21, wherein said step of designating said sequence of instructions as invisible is performed by a macroinstruction.

24. A method of handling a fault which occurs during execution by an industrial controller of an executable program formed by compiling a user program, the method comprising:

A. compiling said user program to form said executable program, said user program including first and second occurrences of a first user-level instruction and first and second occurrences of a second user-level instruction, said compiling step including the steps of 1. replacing said first and second occurrences of said first user-level instruction with a first sequence of executable instructions, such that said executable program contains first and second copies of said first sequence of executable instructions, 2. replacing said first and second occurrences of said second user-level instruction with first and second function calls to a second sequence of executable instructions, such that said executable program contains first and second function calls to said second sequence of executable instructions, and such that there is only a single copy of said second sequence of executable instructions for said first and second occurrences of said second user-level instruction; and B. executing said user program with said industrial controller, wherein a fault occurs during said executing step;

C. reporting said fault, wherein, if said fault occurs during execution of said first copy of said first sequence of executable instructions, then said fault is reported in a manner which designates said first occurrence of said first user-level instruction, wherein, if said fault occurs during execution of said second copy of said first sequence of executable instructions, then said fault is reported in a manner which designates said second occurrence of said first user-level instruction, wherein, if said fault occurs during an execution of said second sequence of executable instructions corresponding to said first function call, then said fault is reported in a manner which designates said first occurrence of said second user-level instruction, and wherein, if said fault occurs during an execution of said second sequence of executable instructions corresponding to said second function call, then said fault is reported in a manner which designates said second occurrence of said second user-level instruction.

25. A method according to claim 24, wherein said second user-level instruction is implemented by a built-in function formed of said second sequence of instructions.

26. A method according to claim 24, wherein said second user-level instruction is an encapsulated user-level instruction, said encapsulated user-level instruction being an encapsulation of a plurality of user-level instructions.

27. A method according to claim 26, further comprising the step of encapsulating said plurality of user-level instructions so as to form said encapsulated user-level instruction, said encapsulating step being performed by a first user of said industrial controller, and wherein said user program is a program written by a second user of said industrial controller.

* * * * *